United States Patent [19]

Yeh

[11] Patent Number: 4,681,446
[45] Date of Patent: Jul. 21, 1987

[54] PHASE CONJUGATE FIBER GYROSCOPE

[75] Inventor: Pochi A. Yeh, Thousand Oaks, Calif.

[73] Assignee: Rockwell International Corporation, El Segundo, Calif.

[21] Appl. No.: 619,255

[22] Filed: Jun. 11, 1984

[51] Int. Cl.⁴ .......................... G01C 19/64; G01B 9/02
[52] U.S. Cl. ..................................... 356/350; 356/351
[58] Field of Search ........................................ 356/350

[56] References Cited

U.S. PATENT DOCUMENTS

| | | | |
|---|---|---|---|
| 3,721,497 | 3/1973 | Shutt et al. | 356/350 |
| 3,752,586 | 8/1973 | Hutchings et al. | 356/350 |
| 3,807,866 | 4/1974 | Zingery | 356/350 |
| 4,120,587 | 10/1978 | Vali et al. | 356/350 |
| 4,159,178 | 6/1979 | Vali et al. | 356/350 |
| 4,271,397 | 6/1981 | Stiles et al. | 356/350 X |
| 4,396,290 | 8/1983 | Morris | 356/350 |
| 4,405,236 | 9/1983 | Mitsuhashi et al. | 356/350 |
| 4,408,882 | 10/1983 | Sheem | 356/350 |
| 4,410,275 | 10/1983 | Shaw et al. | 356/350 |
| 4,432,647 | 2/1984 | Leitl | 356/350 |
| 4,575,245 | 3/1986 | Borde | 356/350 |

FOREIGN PATENT DOCUMENTS 0063977  11/1982  European Pat. Off. ............ 356/350

OTHER PUBLICATIONS

"Scalar Phase Conjugator for Polarization Correction", Yeh Optics Communications vol. 51 #3, 1 Sep. 1984, pp. 195–197.
Fisher et al. "Image Transmission & Interferometry With Multimode Fibers Using Self-Pumped Phase Conjugation", Appl. Phys. Lett. 46(2) 15 Jan. 1985 pp. 113–114.
Fisher et al., "New Optical Gyroscope Based On The Ring-Passive Phase Conjugator" Appl. Phys. Lett. 47(1) 1 Jul., 1985 pp. 1–3.
"Optical Phase Conjugation," Edited by Fisher, Academic Press Inc., Copyright 1983, pp. 71 and 72.
Bergh, et al., All-Single-Mode Fiber-Optic Gyroscope, Optics Letters, vol. 6, p. 198 (Apr. 1981).
Bergh, et al., All-Single-Mode Fiber-Optic Gyroscope with Long-Term Stability, Optics Letters, vol. 6, p. 502 (Oct. 1981).
Bulmer, et al., Fiber Gyroscope with Nonreciprocally Operated, Fiber-Coupled LiNbO₃ Phase Shifter, Optics Letters, vol. 6, p. 572 (Nov. 1981).
Cahill, et al., Phase-Nulling Fiber-Optic Laser Gyro, Optics Letters, Vol. 4, p. 93 (Mar. 1979).
Davis, et al., Closed-Loop, Low-Noise Fiber-Optic Rotation Sensor, Optics Letters, vol. 6, p. 505 (Oct. 1981).
Giuliano, Applications of Optical Phase Conjugation, Physics Today, p. 27 (Apr., 1981).
Yariv, Phase Conjugate Optics and Real-Time Holography, IEEE Journal of Quantum Electronics, vol. QE-14, p. 650 (Sep., 1978).

Primary Examiner—Vincent P. McGraw
Attorney, Agent, or Firm—H. Fredrick Hamann; Craig O. Malin; John J. Deinken

[57] ABSTRACT

An optical fiber rotation sensor includes an optical fiber coil and a laser for providing a source of coherent light. A beam splitter divides the light source into a first beam and a second beam. The first beam is coupled into a first end of the coil, so that the first beam propagates through the coil from the first end to a second end of the coil. A reflector, such as a mirror or a phase conjugate reflector, reflects the second beam back toward the beam splitter. A scalar phase conjugate reflector reflects the first beam at the second end of the coil so that the reflected first beam propagates back through the coil to the first end and is recombined with the reflected second beam in the beam splitter. A detector measures the phase difference between the reflected first beam component and the reflected second beam component in the recombined beam.

12 Claims, 4 Drawing Figures

PHASE CONJUGATE FIBER GYROSCOPE

BACKGROUND OF THE INVENTION

This invention is concerned with optical fiber gyroscopes.

A mechanical gyroscope utilizes the inertia of a spinning mass to provide a reference direction useful in various applications, such as the navigation of an airplane or a spacecraft. The moving parts required in a mechanical gyroscope, however, cause some undesirable attributes, such as high drift rates resulting from friction. The ring laser gyroscope was developed to avoid some of these difficulties.

The ring laser gyroscope maintains a constant frame of reference by circulating massless light waves in a closed path. A typical ring laser gyroscope, for example, consists of a triangular resonant cavity defined by three corner mirrors. A gas laser generates a monochromatic light beam which is split into two beams. These beams are made to propagate in clockwise and counterclockwise directions in the cavity. If the gyroscope is rotated about an axis which has a component normal to the plane of the optical path, the frequency of one of the beams will be increased, while the frequency of the other beam will decrease, because of the Doppler effect. The beams can then be extracted and combined to produce a beat frequency which is indicative of the magnitude and direction of the rotation.

Although ring laser gyroscopes have been developed to the point of production, limitations in this device have motivated researchers to seek other design approaches. One of the most significant difficulties with ring laser gyroscopes involves the cavity mirrors. Although the laser beams within the optical cavity would ideally be totally reflected by the mirrors, the reflective surfaces cannot be made perfectly reflective. Consequently, a small amount of light is scattered backward from microscopic scattering centers in each surface, thereby transferring energy to the oppositely travelling wave. At slow rates of rotation, this coupling causes the frequencies of the two beams to lock together at a single frequency, thereby preventing the measurement of such rates.

Although various solutions have been implemented to compensate for this lockin problem, one appealing possibility is the use of an optical fiber to serve as the optical path for the gyroscope. In addition to eliminating mirrors, such an optical fiber gyroscope offers the advantages of low cost and compact size in an apparatus with no moving parts. In its simplest form, a fiber optic gyroscope includes a laser whose output is directed toward a beam splitter, which divides the laser beam into two equal parts. Each beam is coupled into an end of a coiled optical fiber so that one beam traverses the coil in a clockwise direction while the other beam propagates in the counterclockwise direction. Upon exiting the ends of the fiber coil, the beams are recombined in the beam splitter and form an interference pattern at the output of the gyroscope.

The reciprocal phase shifts introduced into the counterpropagating beams by linear propagation will cancel at the output, but rotation of the coil will cause nonreciprocal phase shifts which add together and can thus be used to indicate the magnitude and direction of rotation.

Although the problem of lockin is eliminated in the optical fiber design, other problems arise because this gyroscope will also detect any nonreciprocal effect which causes a phase shift, such as the Faraday effect, the nonlinear Kerr effect, and polarization mode coupling. Polarization mode coupling results from the need to preserve the state of polarization of the laser radiation inside the fiber.

Polarization mode coupling occurs because a single mode fiber actually supports two polarization modes which have similar transverse mode structures but are polarized at 90° with respect to each other. In an ordinary single mode fiber, slight ellipticities in the core cause these polarization modes to have slightly different propagation constants. Coupling between the polarization modes can be caused by many physical mechanisms, such as bending, strain, fiber imperfections, pressure, and thermal or acoustic fluctuations. As a consequence, optical fiber gyroscopes in the prior art have required the use of a perfect single mode birefringent fiber, which will preserve the state of polarization of light passing through it, in order to achieve high sensitivity. It would be much more advantageous, however, to provide an optical fiber gyroscope which could exhibit a high degree of sensitivity while using various kinds of optical fibers, including multimode circular fibers.

SUMMARY OF THE INVENTION

It is a general objective of this invention to provide a new and improved technique for sensing rotation using an optical fiber rotation sensor.

In general, the optical fiber rotation sensor of this invention includes an optical fiber coil and a source of coherent electromagnetic energy. A beam splitter is provided for dividing the electromagnetic energy into a first beam and a second beam. The first beam is coupled into a first end of the coil, such that it propagates through the coil from the first end to a second end of the coil. A scalar phase conjugate reflector reflects the first beam at the second end of the coil such that the reflected beam propagates back through the coil to the first end. A detector may then be used to measure the phase difference between the reflected beam and the second beam.

Several different scalar phase conjugate reflector designs are contemplated for use in this invention. One such reflector includes an isotropic nonlinear medium for receiving the first beam and a pair of p-polarized, counterpropagating laser beams for pumping the nonlinear medium, with the counterpropagating beams orthogonal to the first beam within the nonlinear medium.

Another scalar phase conjugate reflector which can be utilized include two photorefractive crystals. The first crystal receives the first beam and is associated with a first pair of counterpropagating laser beams for pumping the crystal. This pair of pumping beams has a polarization direction which is orthogonal to the first beam within the first crystal. A second photorefractive crystal receives that portion of the first beam transmitted by the first crystal, with a second pair of counterpropagating laser beams for pumping the second crystal. The polarization direction of the second pair of pumping beams is orthogonal to the first beam within the crystals and orthogonal to the polarization direction of the first pair of pumping beams.

A third scalar phase conjugate reflector is similar to the second in that it includes analogous first and second crystals, each equipped with a pair of pumping beams with the prescribed polarizations. This reflector also includes, however, a polarizing beam splitter for dividing the first beam into first and second orthogonally polarized components. The first crystal receives and reflects the first component, while the second crystal receives and reflects the second component.

A reflector may be provided for reflecting the second beam back toward the beam splitter to be recombined with the reflected first beam. This reflector may be a conventional mirror or a phase conjugate reflector. In addition, the fiber coil may be a birefringent fiber coil or a multimode fiber coil. The source of coherent light may be provided by a laser.

A method of sensing rotation according to this invention includes the steps of dividing a source of coherent electromagnetic energy into a first beam and a second beam and coupling the first beam into a first end of an optical fiber coil subject to the rotation such that the first beam propagates through the coil from the first end to a second end of the coil. At the second end, a reflected beam is created which is the scalar phase conjugate of the first beam and the reflected beam is directed back through the coil to the first end. The phase difference between the reflected beam and the second beam is then measured to provide an indication of the magnitude and direction of the rotation.

BRIEF DESCRIPTION OF THE DRAWINGS

Additional details of the invention are discussed in the descriptive section below, which refers to the following drawings.

DESCRIPTION OF THE INVENTION

Polarization scrambling is a well known source of noise in optical fiber gyroscopes. The phase conjugate optical fiber gyroscope of this invention utilizes scalar phase conjugation to restore polarization scrambled waves to their original states of polarization and thereby eliminate the noise caused in such gyroscopes by polarization scrambling.

Figure 1:
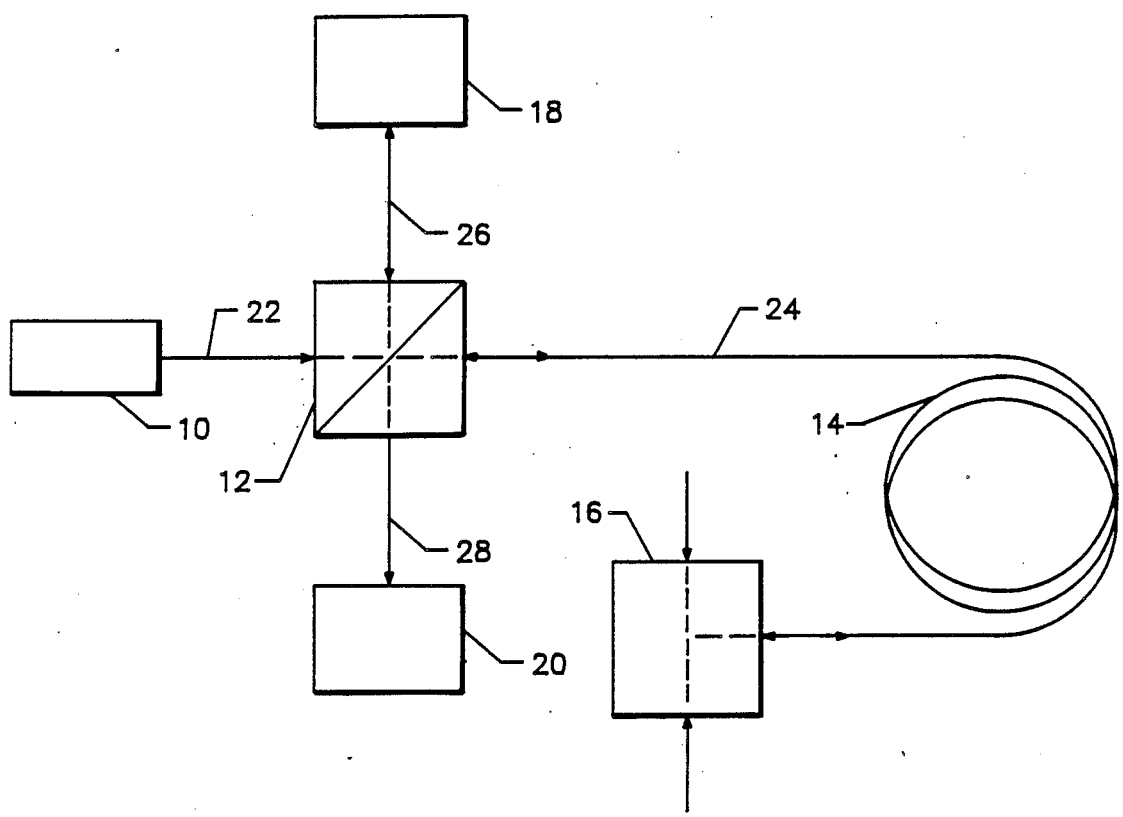
FIG. 1 is a schematic view of a phase conjugate fiber optic gyroscope constructed according to the present invention.

FIG. 1 is a schematic view of a phase conjugate fiber optic gyroscope constructed according to the present invention. The gyroscope includes a laser 10, a prism beam splitter 12, a coiled optical fiber 14, a scalar phase conjugate reflector 16, a reflector 18, and a detector 20. The laser, beam splitter, fiber coil, and detector are conventional items well known in the art and need not be discussed in any further detail.

When the laser beam 22 enters the beam splitter 12, it is divided into two beams. A first beam 24 is coupled into the fiber 14, while a second beam 26 is directed toward the reflector 18. The first beam 24 propagates clockwise through the fiber until it reaches the phase conjugate reflector 16. During propagation through the fiber, the beam 24 will generally undergo changes in polarization, intensity distribution, and phase. The reflector 16, however, because it is a scalar phase conjugate reflector, generates a time reversed version of the first beam 24. This reflected beam will thus, in propagating counterclockwise from the reflector 16 to the beam splitter 12, erase all the reciprocal changes which were introduced into the beam 24 during its clockwise travel. The only effects which will not be corrected are any nonreciprocal phase shifts which were introduced as a result, for example, of rotation of the coil 14 about an axis having a component perpendicular to the plane of the coil. Such a rotation will produce a change of phase $\Delta\phi$ which is proportional to the rotation rate $\Omega$. The phase shift $\phi_1$ introduced during the clockwise trip from the beam splitter 12 to the reflector 16 is:

$$\phi_1 = kL - (2\pi LR\Omega)/(\lambda c) \qquad (1)$$

where L is the length of the fiber coil 14, R is the radius of the coil, $\Omega$ is the rotation rate, $\lambda$ is the wavelength, $k = (2\pi n)/\lambda$, and c is the velocity of light.

The phase shift $\phi_2$ produced when the beam propagates from the reflector 16 back to the beam splitter 12 is:

$$\phi_2 = kL + (2\pi LR\Omega/\lambda c) \qquad (2)$$

Due to the phase reversing property of the phase conjugate reflector 16, the net phase shift $\Delta\phi$ which occurs in a round trip of the beam 24 is therefore:

$$\Delta\phi = \phi_2 - \phi_1 = 4\pi LR\Omega\lambda C \qquad (3)$$

This net phase change is proportional to the rotation rate $\Omega$ and thus can be used for rotation sensing. Since the phase conjugate reflector 16 is a scalar reflector (which is discussed in more detail below), the polarization state will not change upon reflection, so that a true time-reversed version of the incident wave will be produced and will cancel all the reciprocal changes imposed on the incident wave, such as polarization scrambling and modal aberration, when the reflected beam propagates counterclockwise from the reflector 16 to the beam splitter 12. Thus the problem of polarization scrambling, as well as modal aberration in multimode fibers, can be avoided in a fiber optic gyroscope by using scalar phase conjugation.

When the first beam 24 returns to the splitter 12 after reflection by the reflector 16, it will be reflected and recombined with the second beam 26 to produce a third beam 28. The combined beams will produce, due to their common origin, an interference pattern which represents their phase difference and which can be analyzed by the detector 20. Detectors suitable for this function are well known to those skilled in the prior art. The intensity I of the interference pattern will be:

$$I = \tfrac{1}{2} I_0 [1 + \cos(\phi_0 + \Delta\phi)] \qquad (4)$$

The rotation rate $\Omega$ can then be derived by measuring the phase of this intensity pattern.

Although the optical fiber gyroscope of this invention can be operated with a conventional mirror serving as the reflector 18, it is preferable to use a phase conjugate reflector. When a phase conjugate reflector is used, any distortion introduced into the second beam 26 by perturbations such as vibration or temperature change can be eliminated.

Phase conjugation is an optical phenomenon that has attracted considerable attention in recent years. Several different ways of producing phase conjugated beams have been discussed in the literature, including four-wave mixing, stimulated Brillouin scattering, three-wave mixing, and photon echo devices. A review of various applications of optical phase conjugation is presented by Giuliano in "Applications of Optical Phase Conjugation", Physics Today, pages 27-35 (April 1981). A general review of this field is provided in A. Yariv, Phase Conjugate Optics and Real-Time Holography, IEEE J. Quantum Electronics, Vol. QE14, Page 650 (1978).

A phase conjugate reflector produces a phase reversed, oppositely directed reflection of an incident beam. A typical phase conjugate reflector known in the prior art is the four-wave mixer, in which a pair of contradirectional laser beams are directed into a nonlinear medium. An initializing laser beam, equal in frequency to the contradirectional laser beams, is directed into the nonlinear medium from the side. As a result of the action of the various beams within the mixing medium, a reflected beam emerges in a direction opposite to that of the incident beam. Since power is pumped into the system by the contradirected beams, the phase conjugate reflector may also be used to amplify the intensity of the reflected beam.

In addition to being retroreflective to the incident beam, the phase conjugated reflected beam undergoes a phase reversal with respect to the incident beam at the point of reflection. Thus the phase angle of the reflected beam will be equal in absolute magnitude but reversed in polarity with respect to the incident beam. In general, a phase conjugate reflector will also change the state of polarization of a reflected wave. If E is the electric field of an incident wave, an ordinary phase conjugate reflector will generate a wave $\rho E^*$, where $\rho$ is the phase conjugate reflectance tensor and is, in general, a $3 \times 3$ tensor. When this occurs, the phase conjugate reflector cannot be used for polarization correction. In the case of a scalar phase conjugator, however, $\rho$ reduces to a scalar quantity, so that such a phase conjugator can serve to correct polarization scrambling as well as wave front aberrations. Several possible phase conjugation schemes, such as those shown in FIGS. 2-4, might be used as the reflector 16 to achieve the necessary scalar phase conjugation in this invention.

Figure 2:
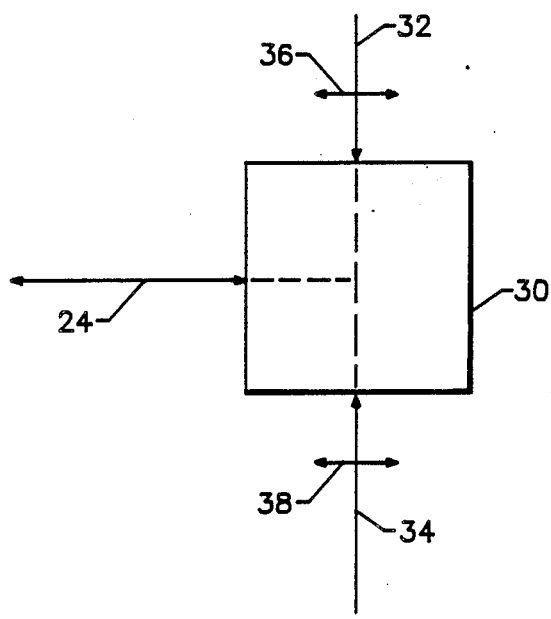
FIG. 2 illustrates in schematic form a scalar phase conjugator.

FIG. 2 illustrates in schematic form a scalar phase conjugator which includes an isotropic nonlinear medium 30 such as, for example, $CS_2$, which is pumped by a pair of counterpropagating beams 32 and 34. The pump beams are p-polarized, as shown by the arrows 36 and 38, and are oriented perpendicular to the beam 24. The polarization state of the pump beams 30 and 32 is thus orthogonal to that of the beam 24. Consequently, the phase conjugate reflected beam will be scalar.

Figure 3:
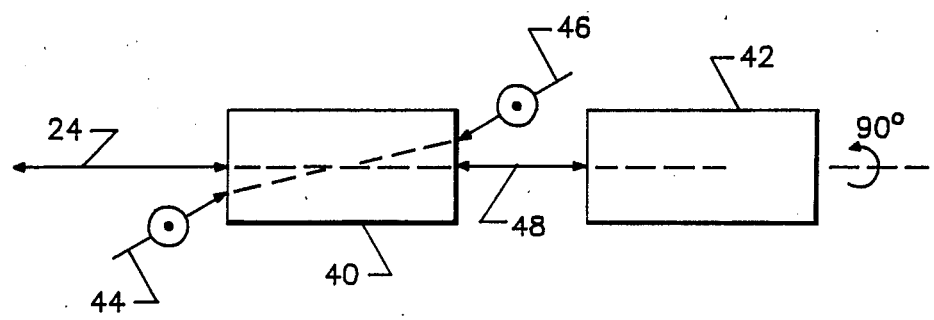
FIG. 3 depicts a second design for a scalar phase conjugator.

A second arrangement for achieving scalar phase conjugation is depicted in FIG. 3. Here a first photorefractive crystal 40 and a second photorefractive crystal 42 perform the phase conjugation function. The pump beams 44 and 46 for the first crystal 40 are polarized perpendicular to the plane of the drawing. With this arrangement, the crystal operates in the holographic regime, using the photorefractive effect, so that it will respond to only one linear polarization state in the beam 24 and will have no effect on the other polarization state. Therefore, the portion 48 of the beam 24 having the latter polarization state will pass through unaffected until it reaches the second crystal 42. The second crystal 42 is identical to the first, but is rotated 90° about the axis of the beam 24 with respect to the first crystal (the pump beams for the second crystal are not shown). The portion 48 of the beam 24 is phase conjugate reflected by the crystal 42, then will pass through the first crystal 40, and combine with the portion reflected by the first crystal in a scalar phase conjugate reflected beam.

Figure 4:
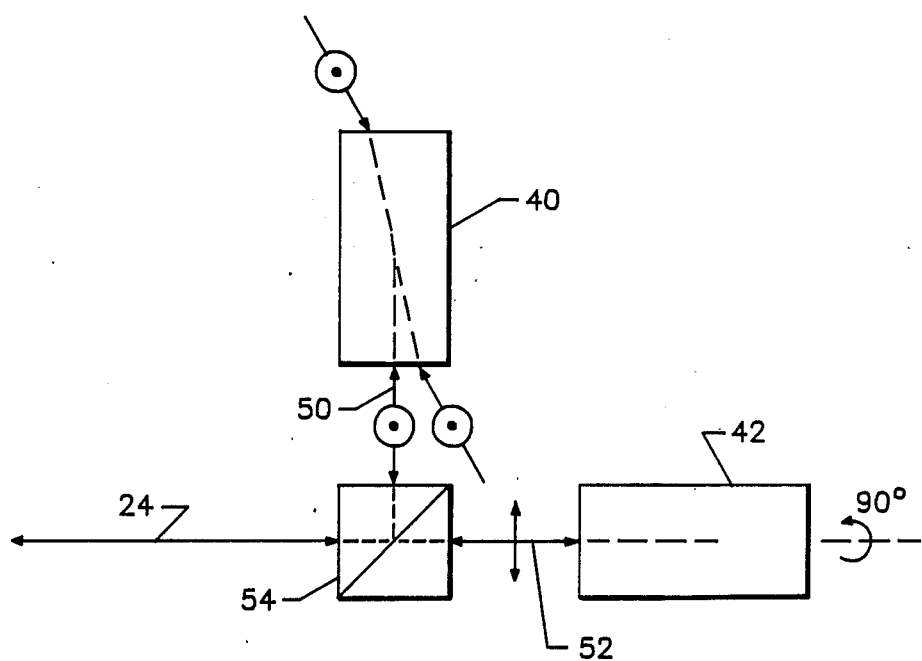
FIG. 4 is a schematic drawing of a third scalar phase conjugator design.

An alternative arrangement which is similar to FIG. 3 is shown in FIG. 4. Here, the photorefractive crystals 40 and 42 are positioned to receive orthogonally polarized components 50 and 52 of the beam 24, the beam being divided into these components by means of a polarizing beam splitter 54. The phase conjugate reflected components are then recombined by the beam splitter 54 to form a scalar phase conjugate beam reflected back into the fiber coil 14.

In conclusion, although several different embodiments of the invention have been described, modifications and additional embodiments will undoubtedly be apparent. Those skilled in the art will appreciate, for example, that a coupling device is generally required to efficiently couple a laser beam into an optical fiber. In general, equivalent elements may be substituted for those described herein, parts might be interchanged, connections might be reversed, and certain features of the invention might be used independently of other features. Consequently, the particular examples which have been presented should be considered as illustrative only and not inclusive, the appended claims being more indicative of the full scope of the invention.

I claim:
1. An optical fiber rotation sensor, comprising:
   an optical fiber coil;
   a source of coherent electromagnetic energy;
   a beam splitter for dividing the energy into a first beam coupled into a first end of the coil, such that the first beam propagates through the coil from the first end to a second end of the coil, and a second beam;
   a scalar phase conjugate reflector for reflecting the first beam at the second end of the coil such that the reflected beam propagates back through the coil to the first end; and
   a detector for measuring the phase difference between the reflected beam and the second beam.
2. The sensor of claim 1, wherein the scalar phase conjugate reflector further comprises:
   an isotropic nonlinear medium for receiving the first beam; and
   a pair of p-polarized, counterpropagating laser beams for pumping the nonlinear medium, the counterpropagating beams being orthogonal to the first beam within the nonlinear medium.
3. The sensor of claim 1, wherein the scalar phase conjugate reflector further comprises:
   a first photorefractive crystal for receiving the first beam;
   a first pair of counterpropagating laser beams for pumping the first crystal, the first pair of pumping beams having a polarization direction orthogonal to the first beam within the first crystal;
   a second photorefractive crystal for receiving that portion of the first beam transmitted by the first crystal;
   a second pair of counterpropagating laser beams for pumping the second crystal, the second pair of pumping beams having a polarization direction orthogonal to the first beam within the crystals and orthogonal to the polarization direction of the first pair of pumping beams.

4. The sensor of claim 1, wherein the scalar phase conjugate reflector further comprises:
- a polarizing beam splitter for dividing the first beam into first and second orthogonally polarized components;
- a first photorefractive crystal for receiving the first component;
- a first pair of counterpropagating laser beams for pumping the first crystal, the first pair of pumping beams having a polarization direction orthogonal to the first component within the first crystal;
- a second photorefractive crystal for receiving the second component;
- a second pair of counterpropagating laser beams for pumping the second crystal, the second pair of pumping beams having a polarization direction orthogonal to the second component within the crystals and orthogonal to the polarization direction of the first pair of pumping beams.

5. The sensor of claim 1, further comprising a reflector for reflecting the second beam back toward the beam splitter to be recombined with the reflected first beam.

6. The sensor of claim 5, wherein the second beam reflector further comprises a mirror.

7. The sensor of claim 5, wherein the second beam reflector further comprises a phase conjugate reflector.

8. The sensor of claim 1, wherein the optical fiber coil further comprises a birefringent fiber coil.

9. The sensor of claim 1, wherein the optical fiber coil further comprises a multimode fiber coil.

10. The sensor of claim 1, wherein the source of coherent electromagnetic energy further comprises a laser.

11. An optical fiber rotation sensor, comprising:
- an optical fiber coil;
- a laser for providing a source of coherent light;
- a beam splitter for dividing the light source into a first beam coupled into a first end of the coil, such that the first beam propagates through the coil from the first end to a second end of the coil, and a second beam;
- a mirror for reflecting the second beam back toward the beam splitter;
- a scalar phase conjugate reflector for reflecting the first beam at the second end of the coil such that the reflected first-beam propagates back through the coil to the first end and is recombined with the reflected second beam in the beam splitter; and
- a detector for measuring the phase difference between the reflected first beam component and the reflected second beam component in the recombined beam.

12. A method of sensing rotation, comprising the steps of:
- dividing a source of coherent electromagnetic energy into a first beam and a second beam;
- coupling the first beam into a first end of an optical fiber coil subject to the rotation such that the first beam propagates through the coil from the first end to a second end of the coil;
- creating a reflected beam which is the scalar phase conjugate of the first beam such that the reflected beam propagates back through the coil to the first end; and
- measuring the phase difference between the reflected beam and the second beam.

* * * * *